United States Patent
Goldfarb (10) Patent No.: US 8,923,707 B2
(45) Date of Patent: Dec. 30, 2014

(54) APPARATUS FOR COMPENSATING OPTICAL SIGNAL IMPAIRMENTS

(75) Inventor: Gilad Goldfarb, San Jose, CA (US)

(73) Assignee: Infinera Corporation, Sunnyvale, CA (US)

(*) Notice: Subject to any disclaimer, the term of this patent is extended or adjusted under 35 U.S.C. 154(b) by 344 days.

(21) Appl. No.: 12/814,560

(22) Filed: Jun. 14, 2010

(65) Prior Publication Data

US 2011/0305464 A1  Dec. 15, 2011

(51) Int. Cl.
  *H04B 10/61* (2013.01)
  *H04B 10/50* (2013.01)
(52) U.S. Cl.
  CPC ........ *H04B 10/611* (2013.01); *H04B 10/50597* (2013.01); *H04B 10/615* (2013.01); *H04B 10/6161* (2013.01); *H04B 10/6165* (2013.01)
  USPC .......................................... 398/208; 398/203
(58) Field of Classification Search
  USPC ........................................................ 398/208
  See application file for complete search history.

(56) References Cited

U.S. PATENT DOCUMENTS

| | | | | |
|---|---|---|---|---|
| 5,115,332 A | * | 5/1992 | Naito et al. | 398/202 |
| 2010/0215357 A1 | * | 8/2010 | Westlund et al. | 398/16 |
| 2010/0232805 A1 | * | 9/2010 | Cai | 398/158 |

* cited by examiner

*Primary Examiner* — Nathan Curs
(74) *Attorney, Agent, or Firm* — David L. Soltz (57) ABSTRACT

Consistent with the present disclosure, a portion of light output from a laser, such as a local oscillator laser, is supplied to an optical circuit. The optical circuit may include a delay line interferometer that supplies a further optical signal that is sensed by a photodetector circuit. Alternatively, a 90 degree optical hybrid may be provided which receives two inputs whereby one input is delayed relative to the other input. The outputs of the optical hybrid are also supplied to a photodetector circuit. An electrical signal output from the photodetector circuit is indicative of changes in phase of the light output from the laser. A processor circuit may be configured to process the electrical signal to determine an accumulated phase of the laser light based on the electrical signal. Alternatively, based on the electrical signal, phase offset values may be obtained to offset or compensate local oscillator phase noise. In another example, the laser may be provided in an optical transmitter, and the electrical signal may be used to correct for undesired phase changes in a modulated optical signal. Further, the electrical signal may be provided to measure the phase noise for diagnostic or monitoring purposes.

24 Claims, 6 Drawing Sheets

APPARATUS FOR COMPENSATING OPTICAL SIGNAL IMPAIRMENTS

BACKGROUND

Optical communication systems are known in which optical signals carrying data are transmitted from a first node to a second or receive node over an optical fiber. At the receive node, the optical signals are converted into corresponding electrical signals, which are then further processed. The optical signals may be both wavelength division multiplexed, in which optical signals having different wavelengths are combined onto an optical fiber, as well as polarization multiplexed, in which optical signals having different polarizations (e.g., transverse electric, TE, and transverse magnetic, TM) are combined onto the fiber. In addition, in one example, the optical signals may be phase modulated to carry the data.

Various techniques are known for detecting or sensing the data carried by an optical signal. In one such technique, coherent detection, a light source or laser, also referred to as a local oscillator, is provided at the receive node. Incoming light of the received optical signal, which, if polarization multiplexed, may be split by a polarization beam splitter (PBS) into two orthogonal signals, having the TE and TM polarizations, respectively. Each signal output from the PBS is combined with the light output from the local oscillator and may be passed through a 90-deg optical hybrid circuit. The optical hybrid circuit, in turn, outputs further optical signals to four pairs of photodiodes or balanced photodetectors, which, in turn, generate corresponding electrical signals.

The electrical signals, which are typically in analog form, are next supplied to an analog-to-digital converter (ADC) circuit, which operates at a sampling rate to generate a series of digital samples at periodic time intervals. Each sample includes a plurality of bits. The samples may then be supplied to a digital signal processor (DSP), which processes the samples to extract the data carried by the optical signals.

The optical signals may be subject to various impairments including chromatic dispersion (CD). CD is due to various frequency components in each signal traveling at different velocities. CD, however, can be compensated or corrected with a known equalizer in the receiver node.

The local oscillator typically includes a laser, which outputs continuous wave (CW) light, that effectively serves as a reference to which the phase, for example, of the incoming signal is compared, such that the data carried by the incoming optical signals can be identified. Light output from the local oscillator, however, may vary in phase. Such additional impairments or phase variations of the local oscillator light are related to the linewidth of the local oscillator laser and other noise sources.

As noted above, local oscillator light is combined with the received optical signal light in the optical hybrid circuit. Accordingly, the digital samples output from the ADC may reflect distortions associated with the local oscillator impairments. The phase variations of the local oscillator light, however, are different from the variations and other impairments experienced by the received optical signals. As a result, a CD compensating equalizer typically does not compensate or offset such distortions associated with the local oscillator light. Moreover, the CD compensating equalizer may introduce further noise in the data output from the receiver node.

Accordingly, there is a need for a receiver node that can minimize impairments associated with a local oscillator.

SUMMARY

Consistent with an aspect of the present disclosure, an apparatus is provided that comprises a laser configured to supply a first optical signal, which has a phase that varies. The apparatus further includes an optical circuit configured to receive a portion of the first optical signal and output a second optical signal. In addition, the apparatus includes a photodetector circuit, including a photodiode. The photodetector circuit receiving the second optical signal and outputting an electrical signal. Moreover, the apparatus includes a processor circuit configured to receive the electrical signal and supply a plurality of symbols, each of which having a value indicative of the phase, accumulated at a corresponding one of a plurality of instants in time.

Consistent with an additional aspect of the present disclosure, an apparatus is provided that comprises a local oscillator laser configured to supply a first optical signal. The first optical signal has a phase that varies, such that at each of a first plurality of successive instants in time, the phase has a corresponding one of a first series of phase values. In addition, the apparatus includes an optical circuit configured to receive a portion of the first optical signal and output a second optical signal. Further, the apparatus includes a photodetector circuit including a photodiode. The photodetector circuit receives the second optical signal and outputs an electrical signal. Moreover, a processor circuit is provided that is configured to receive the electrical signal and supply a first series of symbols, each of which corresponding to a respective one of a second series of phase values. Each of the second series of phase values is equal to a difference between a corresponding first one of the first series of phase values and a corresponding second one of the first series of phase values. The processor circuit is further configured to supply a second series of symbols, each of which having a value indicative of the phase, accumulated at a respective one of the plurality of instants in time.

Consistent with a further aspect of the present disclosure, an apparatus is provided that comprises a laser configured to supply a first optical signal having a phase that varies, such that at each of a first plurality of successive instants in time, the phase has a corresponding one of a first series of phase values. The apparatus also includes an optical circuit configured to receive a first portion of the first optical signal and output a second optical signal. A photodetector circuit is also provided that includes a photodiode. The photodetector circuit receives the second optical signal and outputs a first electrical signal. In addition, an analog-to-digital converter circuit is provided that is configured to receive the first electrical signal and supply a series of samples, each of which corresponding to a respective one of a second series of phase values. Each of the second series of phase values is equal to a difference between a corresponding first one of the first series of phase values and a corresponding second one of the first series of phase values. Further, a driver circuit is provided that is configured to receive the series of samples and generate a second electrical signal in response thereto. Moreover, a modulator is provided that is configured to receive a second portion of the first optical signal and modulate the second portion of the first optical signal, at least in part, in accordance with the second electrical signal.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the disclosure and together with the description, serve to explain the principles of the disclosure.

DESCRIPTION OF THE EMBODIMENTS

Consistent with the present disclosure, a portion of light output from a laser, such as a local oscillator laser, is supplied to an optical circuit. The optical circuit may include a delay line interferometer that supplies a further optical signal that is sensed by a photodetector circuit. Alternatively, a 90 degree optical hybrid may be provided which receives two inputs whereby one input is delayed relative to the other input. The outputs of the optical hybrid are also supplied to a photodetector circuit. An electrical signal output from the photodetector circuit is indicative of changes in phase of the light output from the laser. A processor circuit may be configured to process the electrical signal to determine an accumulated phase of the laser light based on the electrical signal. Alternatively, based on the electrical signal, phase offset values may be obtained to offset or compensate local oscillator phase noise. In another example, the laser may be provided in an optical transmitter, and the electrical signal may be used to correct for undesired phase changes in a modulated optical signal. Further, the electrical signal may be provided to measure the phase noise for diagnostic or monitoring purposes.

Reference will now be made in detail to the present exemplary embodiments of the present disclosure, which are illustrated in the accompanying drawings. Wherever possible, the same reference numbers will be used throughout the drawings to refer to the same or like parts.

Figure 1:
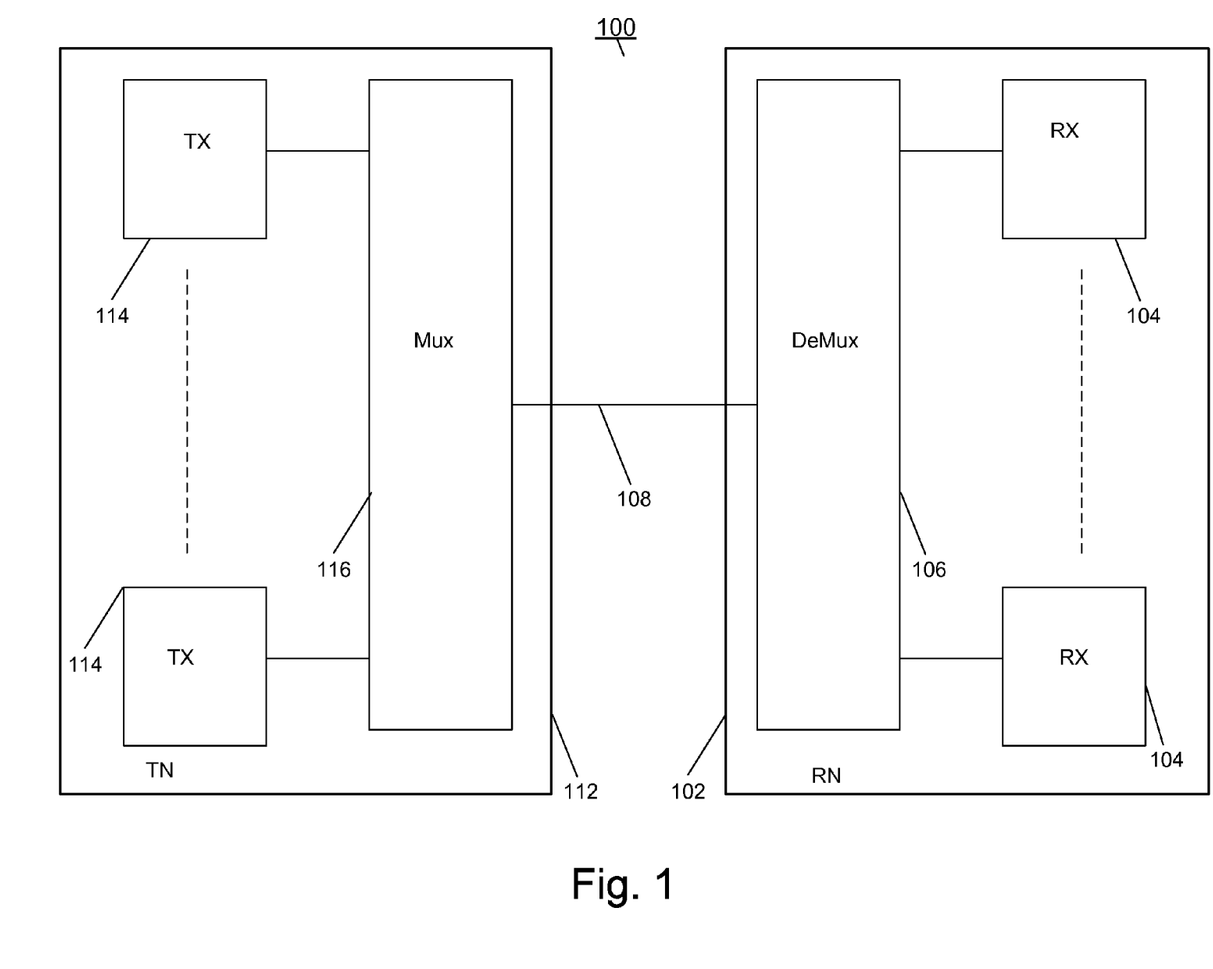
FIG. 1 illustrates an optical communication system consistent with the present disclosure.

FIG. 1 is a block diagram illustrating a system 100 for transmitting and receiving optical signals. System 100 includes a Transmit Node (TN) 112 that includes a plurality of optical transmitters (TX) 114, each TX 114 converting an electrical signal to an optical signal having one of a plurality of wavelengths. Each TX 114 is coupled to a Multiplexer (Mux) 116 that combines the optical signals onto an optical fiber medium, identified as line 108 in FIG. 1. The combined optical signals may constitute a wavelength division multiplexed (WDM) optical signal that is supplied to a Receive Node (RN) 102, which receives and demultiplexes the WDM optical signal with a demultiplexer (Demux) 106. Demux 106, in turn, supplies each optical signal to each of a corresponding one of a plurality of receivers (RX) 104. Each of receivers 104 may constitute a coherent receiver, as discussed in greater detail below with reference to FIG. 2.

Figure 2A:
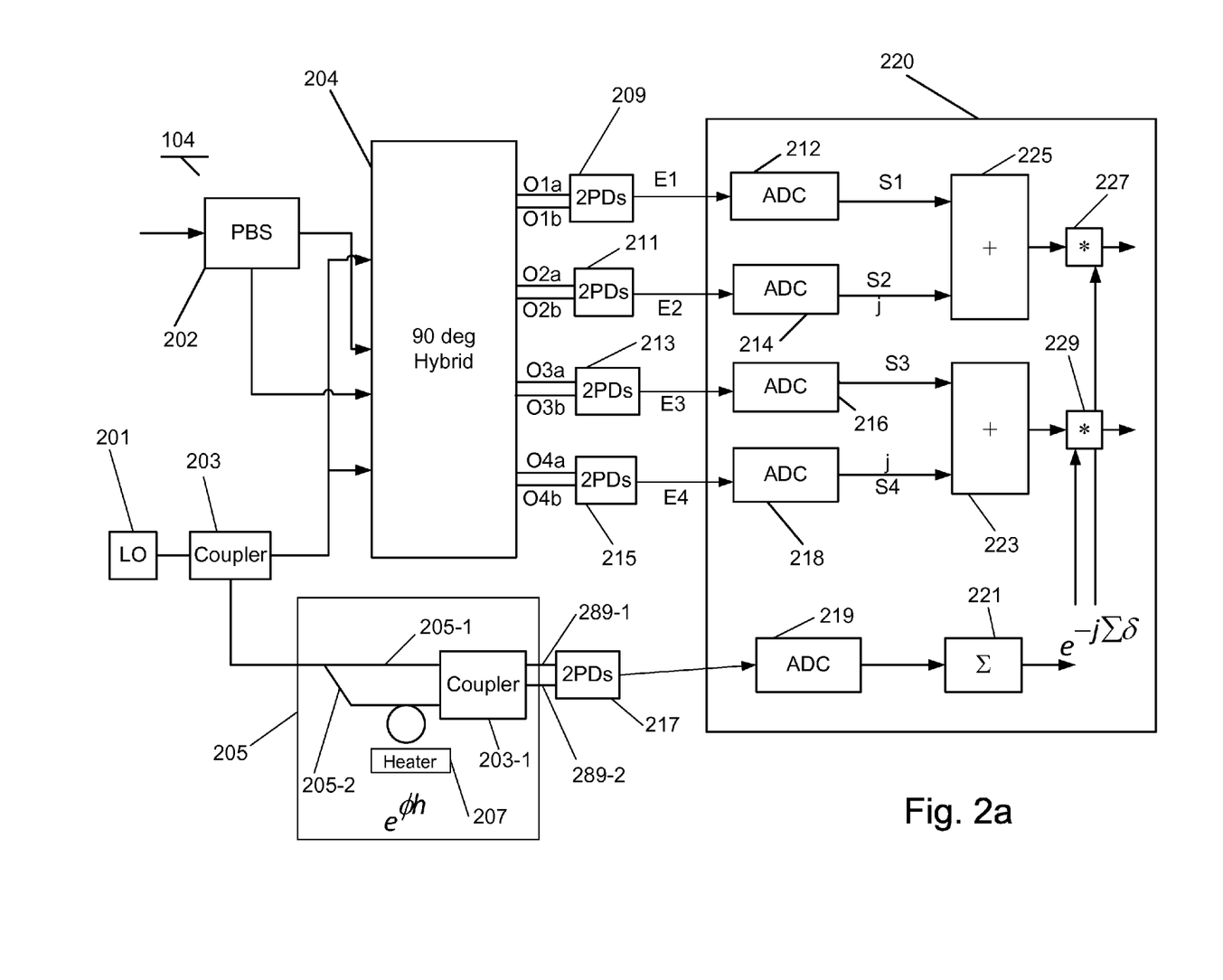
FIG. 2a illustrates an example of a receiver consistent with an aspect of the present disclosure.
Figure 2B:
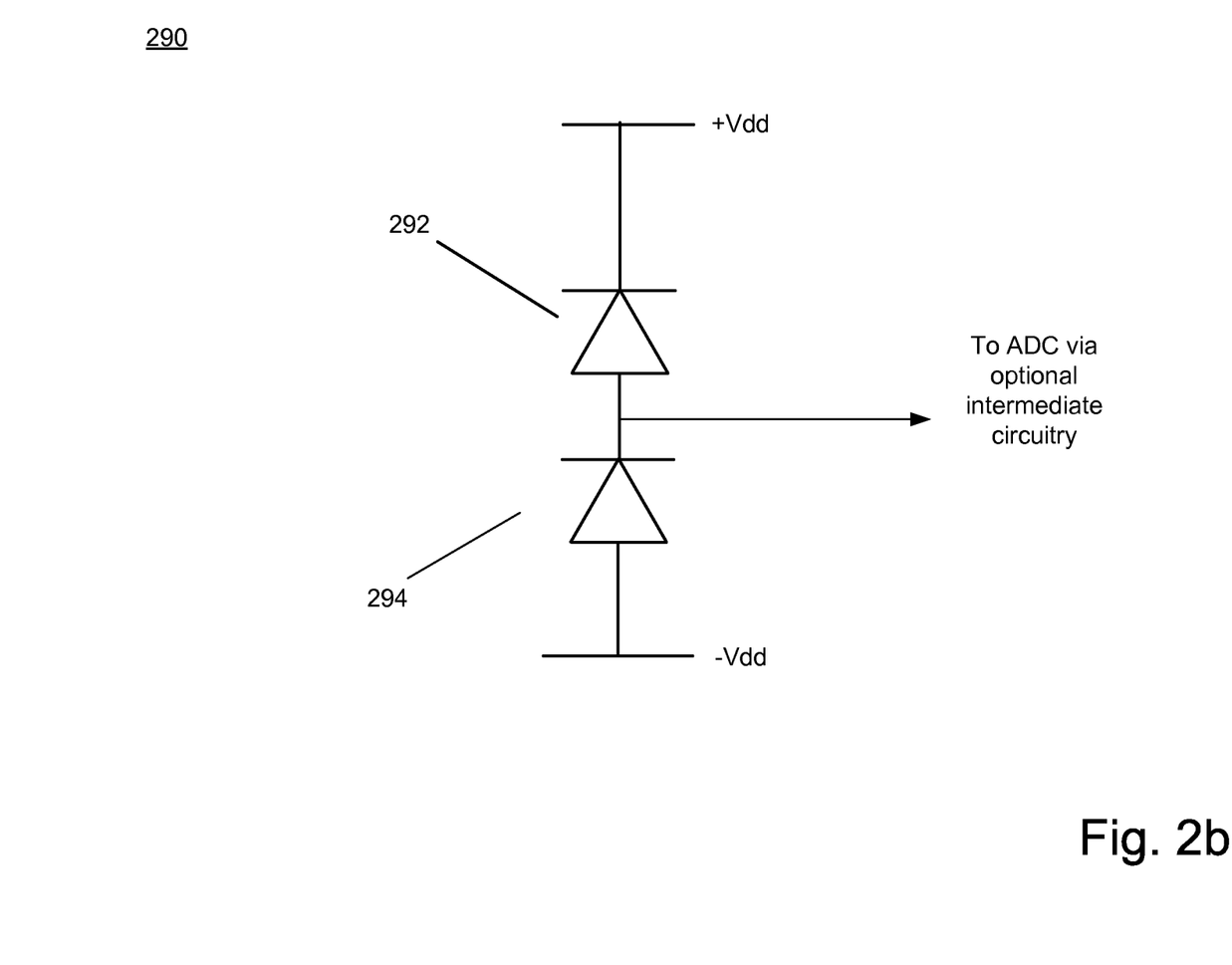
FIG. 2b illustrates an example of a balanced photodiode configuration.

FIG. 2a is a block diagram illustrating in greater detail an example of coherent receiver 104 according to an embodiment of the present disclosure. In one example, a polarization multiplexed optical signal is supplied to receiver 104. In that case, receiver 104 may include a polarization beam splitter (PBS) 202 operable to receive the input optical signal and to separate the signal into X and Y orthogonal polarizations, i.e., vector components of the optical E-field of the incoming optical signal transmitted on optical fiber medium 108. The orthogonal polarizations are then mixed with a laser local oscillator (LO) 201 optical signal (a portion of such optical signal is supplied via coupler or power splitter 203) in 90 degree optical hybrid circuit ("hybrid") 204. Hybrid 204 outputs four optical signals O1a, O1b, O2a, O2b, O3a, O3b, O4a, and O4b, each representing the in-phase and quadrature components of the optical E-field on X and Y polarizations, and each including light from local oscillator 201 and light from polarization beam splitter 202. Optical signals O1a, O1b, O2a, O2b, O3a, O3b, O4a, and O4b are supplied to respective one of photodetector circuits 209, 211, 213, and 215. Each photodetector circuit includes a pair of photodiodes ("2PDs") configured as a balanced detector, for example. FIG. 2b shows an example of a balanced photodiode configuration 290 including first (292) and second (294) photodiodes. As further shown in FIG. 2b, the output of balanced photodiodes 290 may be supplied to one of analog-to-digital conversion (ADC) circuits 212, 214, 216, and 218 (discussed below) via optional intermediate circuitry, such as a transimpedance amplifier. Each photodetector circuit 209, 211, 213, and 215 generates a corresponding one of electrical signals E1 to E4, which may be supplied to processor circuit 220. Electrical signals E1 to E4 are indicative of data carried by optical signals input to PBS 202. These electrical signals may also include a phase noise associated with LO 201, as discussed in greater detail below. Processor circuit 220 may include or constitute a digital signal processor circuit.

The four output signals E1 to E4 from photodetector circuits 209, 211, 213, and 215 comprise four base-band analog electrical signals linearly proportional to the in-phase and quadrature components of the optical E-field on X and Y polarizations. Each of the ADC circuits 212, 214, 216, and 218 is configured to receive a corresponding one of output (electrical) signals E1 to E4 and sample each signal at a given sampling rate (Ts). As a result, each of the ADC circuits supplies a corresponding one of a plurality of series of samples S1 to S4 indicative of data carried by the optical signals input to polarization beam splitter PBS 202. Such data is also carried by optical signals O1a, O1b, O2a, O2b, O3a, O3b, O4a, and O4b output from 90 degree optical hybrid circuit 204. ADC circuits 212, 214, 216, and 218 may be considered as collectively constituting part of processor circuit 220, as shown in FIG. 2a.

As noted above, light supplied by local oscillator 210 is mixed with optical signals output from PBS 202. As such, optical signals O1a, O1b, O2a, O2b, O3a, O3b, O4a, and O4b also include parts or portions of light output from local oscillator laser 201. As further noted above, phase variations of the local oscillator optical signal may not be adequately compensated or offset by conventional CD compensation techniques. Accordingly, such phase variations may cause noise in the data included in samples S1 to S4.

Consistent with an aspect of the present disclosure, however, a portion of the local oscillator (LO) optical signal is supplied from coupler or power splitter 203 to a delay line interferometer (DLI) 205, which includes first 205-1 and second 205-2 waveguides. As a result, part of the LO optical signal portion propagating in waveguide 205-2 is delayed relative to part of the LO optical signal portion propagating in waveguide 205-1. The light traveling in waveguide 205-1 and the light traveling in waveguide 205-2 is then combined by coupler 203-1, which supplies first and second portions of the combined light on inputs 289-1 and 289-2 to corresponding photodiodes in photodetector circuit 217. Photodetector circuit 217 may include one photodiode or a pair of photodiodes configured as a balanced detector (see FIG. 2b). A heater 207 may be provided to adjust a length and/or a refractive index (and thus the optical length) of waveguide 205-2.

Photodetector circuit 217 outputs an electrical signal in response to the light supplied thereto. The electrical signal output from photodetector circuit 217 may be a current or voltage corresponding to the optical electrical field OE of the combined light from waveguides 205-1 to 205-2. Namely, OE satisfies:

$$OE = |E|^2 + |E|^2 - 2*Re\{E \cdot E^* \cdot e^{j\phi h}\} \quad \text{Eq. 1}$$

where E is the electric or E-field of the light propagating in waveguide 205-1, E is the electric or E-field of the light propagating in waveguide 205-2, $e^{j\phi h}$ is a phase introduced by heater 207, E* is a complex conjugate of E, and E* is a complex conjugate of E. E may be expressed as $\cdot e^{j\Phi(t)}$, where φ(t) is the phase of the LO optical signal as a function time, and the E may be expressed as $e^{j\phi(t-Ts)}$, where φ(t−Ts) is the phase of the LO optical signal light delayed in waveguide 205-2 by an amount Ts relative to the optical signal traveling in waveguide 205-1 or. Accordingly, the real component (Re) of Eq. 1 may be expressed as:

$$Re = e^{j\phi(t)} \cdot e^{-j\phi(t-Ts)} \cdot e^{j\phi h} \quad \text{Eq. 2}$$

As generally understood, Eq. 2 may be expressed in terms of cosine, as follows:

$$Re = \cos(\phi(t) - \phi(t-Ts) - \phi h) \quad \text{Eq. 3}$$

By appropriately adjusting the temperature of heater 207, φh may be tuned to be approximately equal to π/2. In that case, Eq. 3 may be expressed in terms of an imaginary or sine term, such that $$\cos(\phi(t) - \phi(t-Ts) - \phi h) = \sin(\phi(t) - \phi(t-Ts))$$

For relatively small values of (φ(t)−φ(t−Ts)), sin(φ(t)−φ(t−Ts))=(φ(t)−φ(t−Ts)). For convenience, (φ(t)−φ(t−Ts)) may be expressed below as "δ".

Accordingly, by appropriately tuning heater 207, the electrical signal output from photodetector circuit 217 can be adjusted to be indicative of a change, difference or variation in phase of the LO optical signal. Since the phase of the LO optical signal varies over time, such phase variations may have particular values at each instant in time, as the LO oscillator optical signal phase changes from one value to the next. Once the changes in LO optical signal phase are determined, based on the output of photodetector circuit 217, for example, the accumulated phase of the LO optical signal phase, at each instant in time, can then be determined, and as discussed in greater detail below, may be used to offset or correct for phase noise present in the data included in samples S1 to S4.

The determination of accumulated noise will next be described below with reference to an exemplary series of phase values, or values of phase changes as indicated by the electrical signal output photodetector circuit 217.

Assume that the accumulated phase of the LO optical signal ("actual phase") has the following series of phase values ("first series of phase values"), each of which occurring at corresponding one of time instants t0, t1, t2, t3, and t4:

| time instant: | t0 | t1 | t2 | t3 | t4 |
|---|---|---|---|---|---|
| actual phase: | 0 | 1 | 3 | 6 | 10 |

The phase difference or δ may be a series of phase values ("second series of phase values"), each of which occurring at a corresponding one of the above time instants. As noted above, each δ, may be indicated by the electrical signal output from photodetector circuit 217. In this example, δ, at each instant in time, is:

| time instant: | t1 | t2 | t3 | t4 |
|---|---|---|---|---|
| phase difference (δ): | 1 | 2 | 3 | 4 |

Accordingly, each phase value (δ) in the above series is equal to (or substantially equal to) the difference between successive ones of the series of actual phase values. Thus, as noted above, once each phase value (δ) is known, the actual phase or accumulated phase of the LO optical signal at each time instant can be calculated by adding each phase value (δ) to an accumulated sum of such phase values. As discussed in greater detail below, after calculating the accumulated phase, phase noise associated with the accumulated noise may be offset or compensated in the data output from processor circuit 220.

For example, as further shown in FIG. 2a, the electrical signal output from photodetector circuit 217 may be applied to analog-to-digital conversion (ADC) circuit 219 of processor circuit 220, which generates successive digital samples of the electrical signal (which is typically in analog form). The samples are periodically output at instants in time separated by a time interval Ts, which may also be the amount of propagation delay associated with waveguide 205-2 relative to that of waveguide 205-1. Alternatively, the delay may be shorter than or longer than Ts, but performance may not be optimal.

The samples output from ADC 219, which represent or are indicative of the phase values δ at each time instant, may then be successively added to a previous sum of such phase values in adder or summer circuit 221. As a result, a series of symbols or values may be obtained, each of which being indicative of a corresponding accumulated phase values at each instant in time, such as instants t1 to t4 noted above. The resulting accumulated phase values or symbols may then be negated (as represented by the expression $e^{-j\Sigma\delta}$) and supplied as an output or value, internally within processor circuit 220, to multiplier circuit 227 and 229. The expression $e^{-j\Sigma\delta}$ is also indicative of the accumulated phase value at each instant in time. Alternatively, such output or value may be supplied external to processor circuit 220.

As noted above, samples S1 to S4 are generated by ADC circuits 212, 214, 216 and 218, respectively. Adder circuit 225 adds, in quadrature, each of samples S1 with a corresponding one of samples S2, while adder circuit 223 adds, in quadrature, each of samples S3 with a corresponding one of samples S4 in quadrature. The series of sums output from adder 225 is supplied to multiplier circuit 227 and the series of sums output from adder 223 is supplied to multiplier circuit 229. Multiplier 227 multiplies each sum output from adder 225 by each symbol or output)($e^{-j\Sigma\delta}$) supplied from summer circuit 221 to thereby provide a series of products. Thus, any noise present in the output from adder 225 is offset or compensated by $e^{-j\Sigma\delta}$. Accordingly, the output (e.g., a product) from multiplier circuit 227 (an electrical signal) is associated with or indicative of data carried by one of the optical signals supplied to PBS 202 and has substantially no phase noise attributable to the LO optical signal. In addition, the output from multiplier circuit 227, which may be an output either within processor circuit 220 or supplied from processor circuit 220 is substantially free of amplitude noise associated with local oscillator 201. Likewise, local oscillator (LO) phase noise present in the output of adder circuit 223 is similarly compensated for or offset by multiplying the output of adder circuit 223 by $e^{-j\Sigma\delta}$ in multiplier circuit 229.

Figure 3:
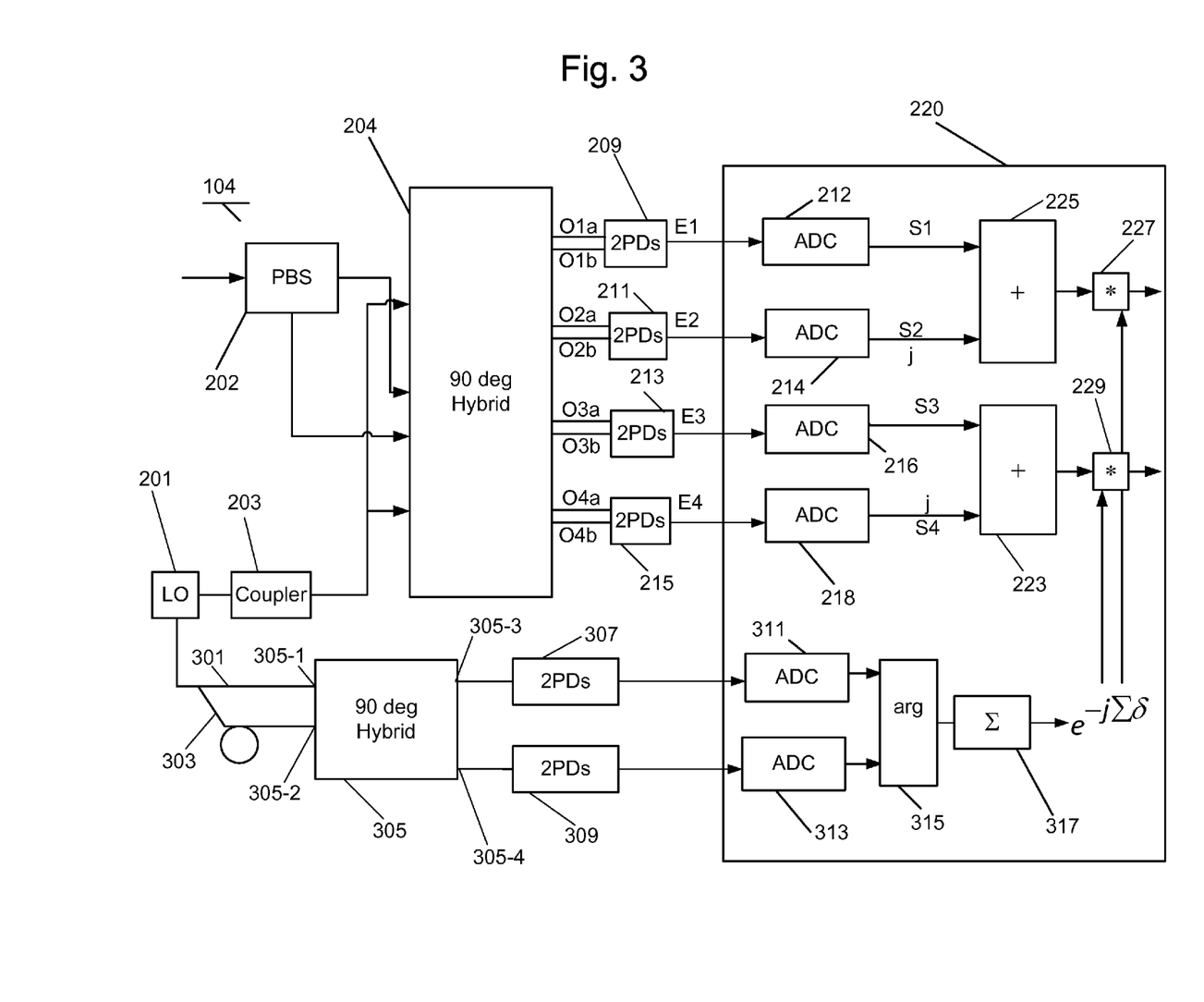
FIG. 3 illustrates another example of a receiver consistent with an aspect of the present disclosure.

FIG. 3 illustrates another example of receiver 104 consistent with an additional aspect of the present disclosure in which the accumulated phase values are determined in accordance with an alternative technique. Receiver 104 includes many of the same elements shown in FIG. 2 that operate in the same or similar fashion as that discussed above in regard to FIG. 2. Receiver 104, however, includes waveguides 301 and 303 that supply first and second parts, respectively, of a portion of the LO optical signal to corresponding inputs 305-1 and 305-2 of 90 degree optical hybrid circuit ("hybrid") 305. Waveguide 303 is longer than waveguide 301 and thus introduces a delay similar to that discussed above in connection with 205-1 and 205-2.

In a known manner, optical hybrid circuit or hybrid 305 supplies real and imaginary components of the quantity ($\phi$(t)−$\phi$(t−Ts)) at outputs 305-3 and 305-4, respectively. Photodetector circuits 307 and 309 are coupled to outputs 305-3 and 305-4, respectively, and include balanced photodiodes ("2PDs") that supply corresponding electrical signals to respective ADC circuits 311 and 313.

Each of ADC circuits 311 and 313 supplies a corresponding series of digital samples of the received electrical signals at a sampling rate of 1/Ts (Ts being the sampling period or interval between successive samples). Each sample output from ADC 311 and ADC 313 is supplied to circuit 317, which determines the argument (arg) associated with these outputs to obtain an angle. The angle corresponds to the cumulative phase discussed above. The cumulative or accumulated phase may next be supplied to multiplier circuit 227 and 229, as noted above, in order to offset LO phase noise in the outputs of adders 225 and 223.

It is noted that FIGS. 2a and 3 illustrate examples of processor circuitry that may be configured to supply an output that is substantially free of phase noise associated with local oscillator 201. Other implementations that supply such an output in which the phase noise has been offset or compensated, for example, would be apparent to those having ordinary skill in the art and are contemplated herein.

In a transmitter, such as transmitter 114 shown in FIG. 1, a laser may be provided to generate light that is modulated in accordance with data to be transmitted to a receiver. Transmitter lasers, like LO lasers, may also suffer from phase noise. Accordingly, the above noted circuitry may also be used to correct for such phase noise in a transmitter laser. For example, with reference to FIG. 4, a transmitter 400 (which may be included in transmitter 114 discussed above in regard to FIG. 1) may include a laser 402, including for example, a distributed feedback (DFB) laser which supplies an optical signal to coupler 203. As noted above, coupler 203 supplies a first optical signal portion to DLI interferometer 205, which operates in conjunction with photodetector circuit 217, ADC 219, and summer 221 to provide a value (which may be negated) that is indicative of the accumulated phase of the optical signal output from laser 402.

Figure 4:
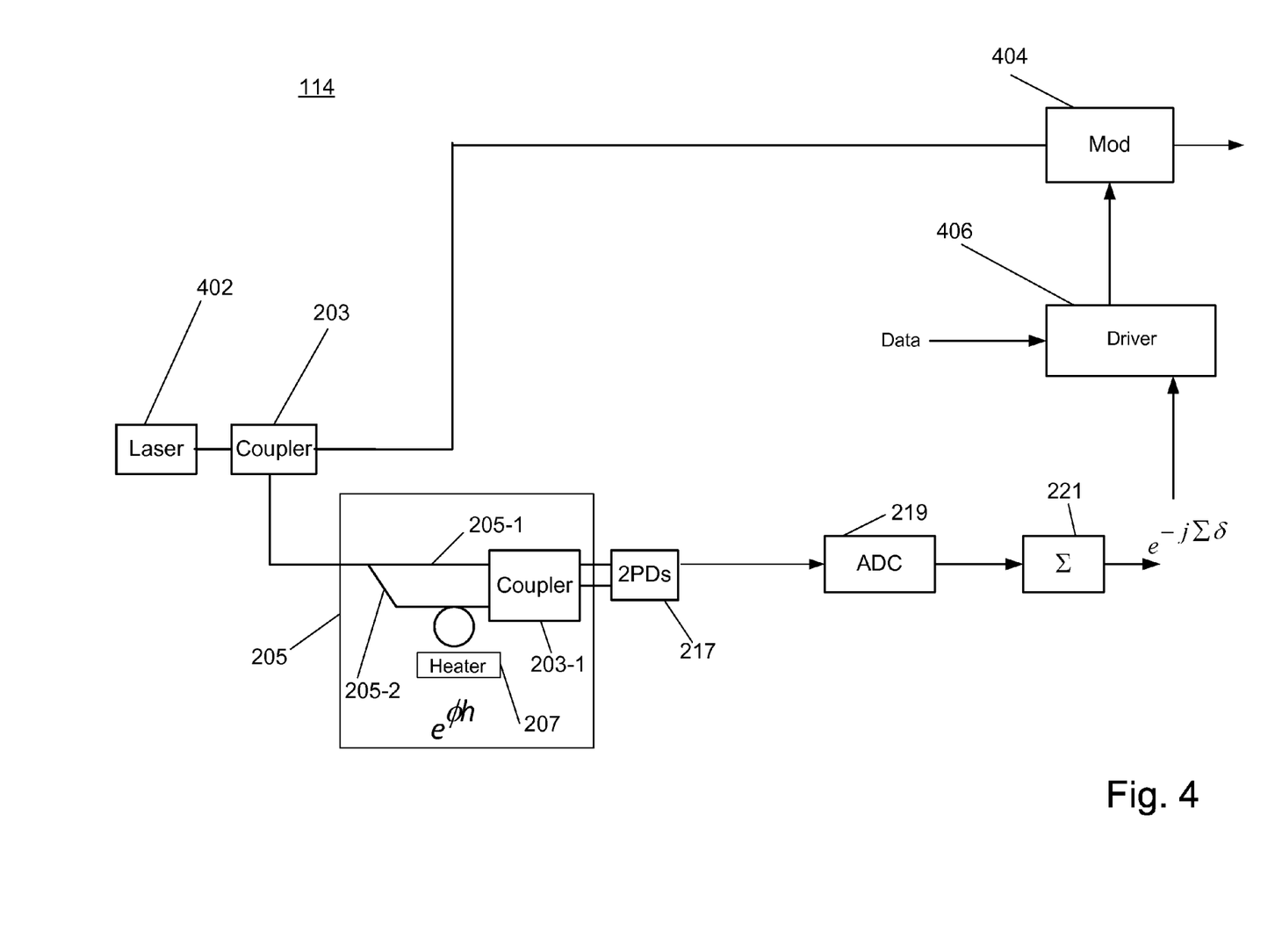
FIG. 4 illustrates an example of a transmitter consistent with an aspect of the present disclosure.

A second optical signal portion of the light output from laser 402 is supplied to a modulator 404, which may include a phase modulator or I/Q modulator (e.g., a nested Mach-Zehnder modulator, as described, for example, in U.S. patent application Ser. No. 12/728,951, filed Mar. 22, 2010, the entire contents of which are incorporated herein by reference) that modulates the received optical signal. Driver circuit 406 receives an electrical signal indicative of the cumulative phase values output from summer 221 (e.g., expression $e^{-j\Sigma\delta}$), as well as data to be carried by optical signals output from modulator 404. Driver circuit 406, in turn, supplies an electrical signal, such as a drive signal, to modulator 404 to appropriately modulate the optical signal to carry the data, as well as substantially offset or eliminate phase noise in the modulated optical signal output from modulator 404. Examples of modulators and driver circuits are described in U.S. patent application Ser. No. 12/645,770, filed on Dec. 23, 2009, and titled "Electrical Return-To-Zero Driver Circuit," the entire contents of which are incorporated herein by reference.

Figure 5:
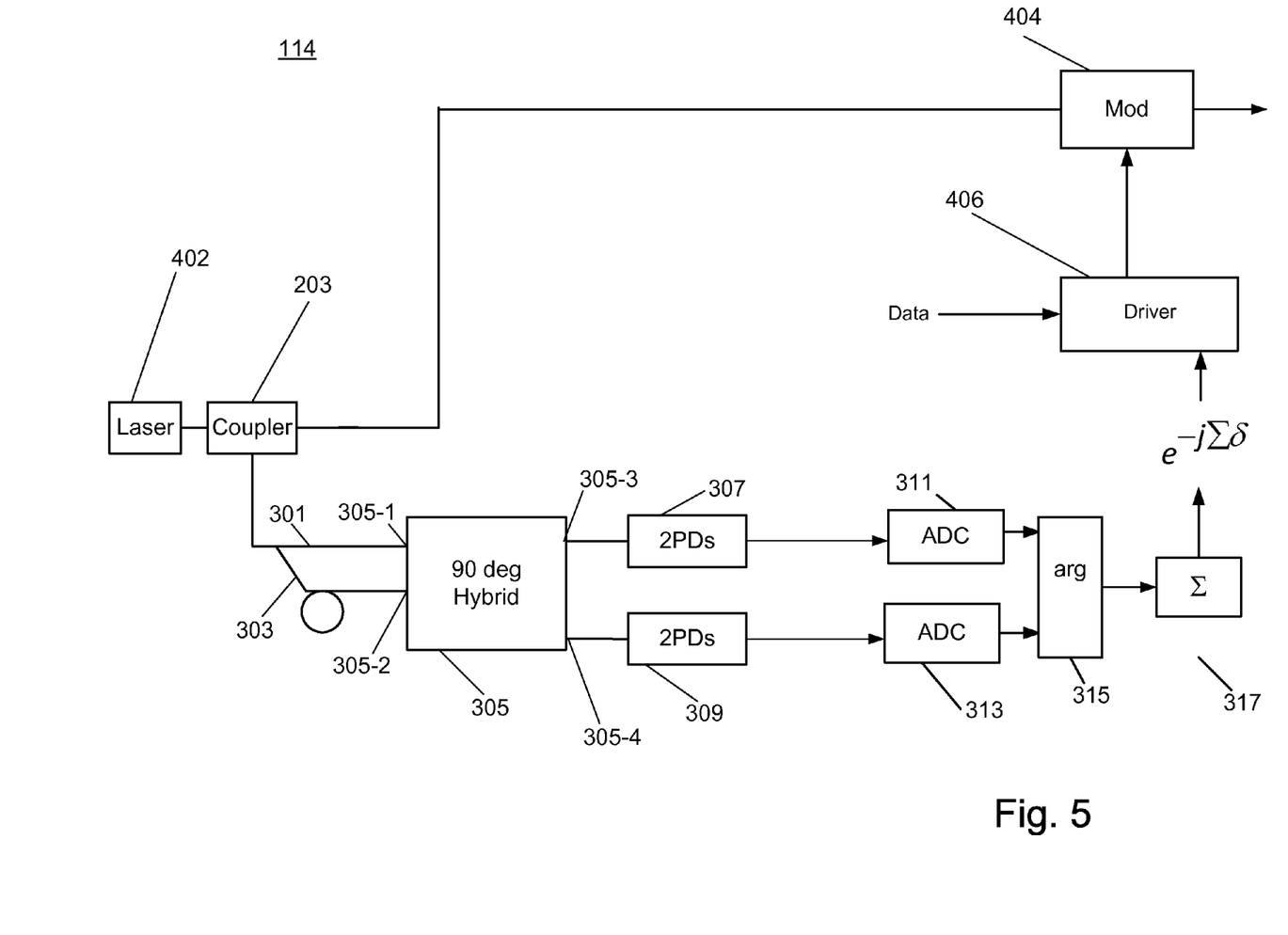
FIG. 5 illustrates another example of a transmitter consistent with the present disclosure.

FIG. 5 illustrates another example of a transmitter (500) including components 301, 303, 305, 307, 309, 311, 313, 315, and 317, which, as discussed above, may also cooperate to generate an accumulated phase value (or negated accumulated phase value). As in FIG. 4, the accumulated phase value may be supplied to driver circuit 406 to drive modulator 404 in such a way as to eliminate or substantially eliminate phase noise in the modulated optical signal output therefrom. Transmitter 500 may alternatively be provided in transmitter 114 shown in FIG. 1.

Although the present disclosure has been described in connection with eliminating the phase noise associated with local oscillator and transmitter lasers, it is understood that the present disclosure is also applicable as a diagnostic tool to measure or sense the phase noise of other lasers.

Other embodiments will be apparent to those skilled in the art from consideration of the specification. For example, FIGS. 2 and 3 illustrate various components, such as ADC circuits, which are provided in processor circuit 220. It is understood, however, that processor circuit 220 may include such components, as well as other components that are provided on separate semiconductor die or provided in one or multiple housings or packages. Thus, processor circuit may include a collection of semiconductor chips, packages and/or printed circuit boards. It is intended that the specification and examples be considered as exemplary only, with a true scope and spirit of the invention being indicated by the following claims.

What is claimed is:

1. An apparatus, comprising:
  a laser configured to supply a first optical signal, the first optical having a phase that varies;
  a first optical circuit configured to receive the first optical signal and having first and second outputs, the first output supplying a first portion of the optical signal and the second output supplying a second portion of the optical signal;
  first and second waveguides coupled to the first output of the first optical circuit, such that light output from the first waveguide is delayed relative to light output from the second waveguide;
  a second optical circuit coupled to the first and second waveguides, the second optical circuit outputting a second optical signal;
  a photodetector circuit, including a photodiode, the photodetector circuit receiving the second optical signal and outputting an electrical signal;
  a processor circuit configured to receive the electrical signal and supply a value indicative of the phase, accumulated at a corresponding one of a plurality of instants in time.

2. An apparatus in accordance with claim 1, wherein the apparatus includes a receiver, the laser being a local oscillator in the receiver.

3. An apparatus, comprising:
  a laser configured to supply a first optical signal, the first optical having a phase that varies;
  an optical circuit configured to receive a first portion of the first optical signal and output a second optical signal;
  a photodetector circuit, including a photodiode, the photodetector circuit receiving the second optical signal and outputting an electrical signal;

a processor circuit configured to receive the electrical signal and supply a value indicative of the phase, accumulated at a corresponding one of a plurality of instants in time, wherein the optical circuit includes a delay line interferometer (DLI).

4. An apparatus in accordance with claim 3, further including a heater configured to adjust a temperature of the DLI.

5. An apparatus, comprising:

a laser configured to supply a first optical signal, the first optical having a phase that varies;

an optical circuit configured to receive a first portion of the first optical signal and output a second optical signal;

a photodetector circuit, including a photodiode, the photodetector circuit receiving the second optical signal and outputting an electrical signal;

a processor circuit configured to receive the electrical signal and supply a value indicative of the phase, accumulated at a corresponding one of a plurality of instants in time, wherein the apparatus includes a receiver, the laser being a local oscillator in the receiver, wherein the receiver is configured to receive a third optical signal, the photodetector circuit is a first photodetector circuit, the photodiode is a first photodiode, the electrical signal is a first electrical signal, and the portion of the first optical signal is a first portion of the first optical signal, the apparatus further including:

a second photodetector circuit, including a second photodiode, the second photodetector circuit being configured to receive the third optical signal carrying data and supply a second electrical signal, the third optical signal including a second portion of the first optical signal, the processor circuit supplying a third electrical signal indicative of the data, the third electrical signal being substantially free of noise associated with the phase.

6. An apparatus in accordance with claim 5, further including a 90 degree optical hybrid circuit, which supplies the third optical signal.

7. An apparatus in accordance with claim 1, wherein the second optical circuit includes a 90 degree optical circuit.

8. An apparatus, comprising:

a local oscillator laser configured to supply a first optical signal, the first optical signal having a phase that varies, such that at each of a first plurality of successive instants in time, the phase has a corresponding one of a first series of phase values;

a first optical circuit configured to receive the first optical signal and having first and second outputs, the first output supplying a first portion of the optical signal and the second output supplying a second portion of the optical signal;

first and second waveguides coupled to the first output of the first optical circuit, such that light output from the first waveguide is delayed relative to light output from the second waveguide;

a second optical circuit coupled to the first and second waveguides, the second optical circuit outputting a second optical signal;

a photodetector circuit including a photodiode, the photodetector circuit receiving the second optical signal and outputting an electrical signal;

a processor circuit configured to receive the electrical signal and supply a series of samples, each of which corresponding to a respective one of a second series of phase values, each of the second series of phase values being substantially equal to a difference between a corresponding first one of the first series of phase values and a corresponding second one of the first series of phase values, the processor circuit further being configured to supply a value indicative of the phase, accumulated at a respective one of the plurality of instants in time.

9. An apparatus in accordance with claim 8, wherein a first and a second one of the first series of phase values are successive ones of the first series of phase values.

10. An apparatus, comprising:

a local oscillator laser configured to supply a first optical signal, the first optical signal having a phase that varies, such that at each of a first plurality of successive instants in time, the phase has a corresponding one of a first series of phase values;

an optical circuit configured to receive a portion of the first optical signal and output a second optical signal;

a photodetector circuit including a photodiode, the photodetector circuit receiving the second optical signal and outputting an electrical signal;

a processor circuit configured to receive the electrical signal and supply a series of samples, each of which corresponding to a respective one of a second series of phase values, each of the second series of phase values being substantially equal to a difference between a corresponding first one of the first series of phase values and a corresponding second one of the first series of phase values, the processor circuit further being configured to supply a value indicative of the phase, accumulated at a respective one of the plurality of instants in time, wherein the optical circuit includes a delay line interferometer.

11. An apparatus in accordance with claim 10, further including a heater that is configured to adjust a temperature of the delay line interferometer.

12. An apparatus in accordance with claim 11, wherein the processor circuit includes:

an analog-to-digital conversion circuit configured to receive the electrical signal and supply each of the plurality of samples at a corresponding one of a plurality of instants in time, each of the plurality of instants in time being separated from one another by a time interval, the delay line interferometer including a first waveguide and a second waveguide that is longer than the second waveguide, such that a first part of the portion of the optical signal propagates in the first waveguide and a second part of the portion of the optical signal propagates in the second waveguide, the second part of the portion of the optical signal being delayed relative to the first part of the portion of the optical signal by a time substantially equal to the time interval.

13. An apparatus in accordance, comprising:

a local oscillator laser configured to supply a first optical signal, the first optical signal having a phase that varies, such that at each of a first plurality of successive instants in time, the phase has a corresponding one of a first series of phase values;

an optical circuit configured to receive a portion of the first optical signal and output a second optical signal;

a photodetector circuit including a photodiode, the photodetector circuit receiving the second optical signal and outputting an electrical signal;

a processor circuit configured to receive the electrical signal and supply a series of samples, each of which corresponding to a respective one of a second series of phase values, each of the second series of phase values being substantially equal to a difference between a corresponding first one of the first series of phase values and a corresponding second one of the first series of phase values, the processor circuit further being configured to supply a value indicative of the phase, accumulated at a respective one of the plurality of instants in time, wherein the portion of the first optical signal is a first portion of the first optical signal, the apparatus further including:

a 90 degree hybrid circuit having a first input and a second input, the first input receiving a third optical signal and the second input receiving a second portion of the first optical signal, the 90 degree hybrid circuit supplying fourth, fifth, sixth, and seventh optical signals.

14. An apparatus in accordance with claim 13, wherein the series of samples is a first series of samples, processor circuit includes a first analog-to-digital conversion circuit configured to supply the first series of samples, the photodetector circuit is a first photodetector circuit, the electrical signal is a first electrical signal supplied to the first analog-to-digital conversion circuit, the apparatus further including:

a second photodetector circuit configured to receive the fourth and fifth optical signals and output a second electrical signal;

a third photodetector circuit configured to receive the sixth and seventh optical signals and output a third electrical signal;

a second analog-to-digital conversion circuit configured to receive the second electrical signal and supply a second series of samples; and a third analog to digital conversion circuit configured to receive the third electrical signal and supply a third series of samples.

15. An apparatus in accordance with claim 13, wherein the processor circuit supplies an output indicative of data carried by the third optical signal, the output being substantially free of noise associated with the phase.

16. An apparatus, comprising:

a local oscillator laser configured to supply a first optical signal, the first optical signal having a phase that varies, such that at each of a first plurality of successive instants in time, the phase has a corresponding one of a first series of phase values;

an optical circuit configured to receive a portion of the first optical signal and output a second optical signal;

a photodetector circuit including a photodiode, the photodetector circuit receiving the second optical signal and outputting an electrical signal;

a processor circuit configured to receive the electrical signal and supply a series of samples, each of which corresponding to a respective one of a second series of phase values, each of the second series of phase values being substantially equal to a difference between a corresponding first one of the first series of phase values and a corresponding second one of the first series of phase values, the processor circuit further being configured to supply a value indicative of the phase, accumulated at a respective one of the plurality of instants in time, wherein the optical circuit includes:

a 90 degree optical hybrid circuit configured to receive a first portion of the first optical signal and a second portion of the first optical signal that is delayed relative to the first portion of the local oscillator signal, the 90 degree optical hybrid circuit outputting second and third optical signals.

17. An apparatus in accordance with claim 16, wherein the 90 degree hybrid circuit is a first 90 degree hybrid circuit, the apparatus further including:

a second 90 degree hybrid circuit having a first input and a second input, the first input of the second 90 degree hybrid circuit receiving a fourth optical signal and the second input of the second 90 degree hybrid circuit receiving a third portion of the first optical signal, the second 90 degree hybrid circuit supplying fifth, sixth, seventh, and eighth optical signals.

18. An apparatus, comprising:

a laser configured to supply a first optical signal having a phase that varies, such that at each of a plurality of instants in time, the phase has a corresponding one of a first series of phase values;

an optical circuit configured to receive a first portion of the first optical signal and output a second optical signal;

a photodetector circuit including a photodiode, the photodetector circuit receiving the second optical signal and outputting a first electrical signal;

an analog-to-digital converter circuit configured to receive the first electrical signal and supply a series of samples, each of which corresponding to a respective one of a second series of phase values, each of the second series of phase values being substantially equal to a difference between a corresponding first one of the first series of phase values and a corresponding second one of the first series of phase values, the processor circuit further being configured to supply a value indicative of the phase, accumulated at a respective one of the plurality of instants in time;

a driver circuit configured to receive a signal indicative of the value and generate a second electrical signal in response thereto; and a modulator configured to receive a second portion of the first optical signal and modulate the second portion of the first optical signal, at least in part, in accordance with the second electrical signal.

19. An apparatus in accordance with claim 18, wherein the first and second ones of the first series of phase values are successive ones of the first series of phase values.

20. An apparatus in accordance with claim 18, wherein the optical circuit includes a delay line interferometer.

21. An apparatus in accordance with claim 20, further including a heater that is configured to adjust a temperature of the delay line interferometer.

22. An apparatus in accordance with claim 18, wherein the optical circuit includes:

a 90 degree optical hybrid circuit configured to receive a first portion of the first optical signal and a second portion of the first optical signal that is delayed relative to the first portion of the local oscillator signal.

23. An apparatus in accordance with claim 18, wherein the modulator includes a phase modulator.

24. An apparatus in accordance with claim 18, wherein the modulator includes a nested Mach-Zehnder modulator.

* * * * *